United States Patent [19]

Paton et al.

[11] Patent Number: 5,135,443

[45] Date of Patent: Aug. 4, 1992

[54] ARRANGEMENT AND METHOD FOR OPERATING A VARIABLE DRIVE UNIT

[75] Inventors: Robert Paton, Passau; Abdul Arain, Kellberg, both of Fed. Rep. of Germany

[73] Assignee: Zahnradfabrik Friedrichshafen AG, Friedrichshafen, Fed. Rep. of Germany

[21] Appl. No.: 654,610

[22] PCT Filed: Aug. 12, 1984

[86] PCT/EP89/00956
§ 371 Date: Feb. 12, 1991
§ 102(e) Date: Feb. 12, 1991

[30] Foreign Application Priority Data

Aug. 17, 1988 [DE] Fed. Rep. of Germany ....... 3827862

[51] Int. Cl.$^5$ .............................................. F16H 47/04
[52] U.S. Cl. ..................................... 475/81; 74/861
[58] Field of Search ............... 475/76, 78, 81; 74/856, 74/857, 859, 861, 862

[56] References Cited

U.S. PATENT DOCUMENTS

| | | | |
|---|---|---|---|
| 3,714,845 | 2/1973 | Mooney, Jr. | 475/81 |
| 3,969,958 | 7/1976 | Miyao et al. | 475/81 X |
| 3,979,972 | 9/1976 | Sakai et al. | 475/81 |
| 4,082,013 | 4/1978 | Dornfeld et al. | 74/859 X |
| 4,183,264 | 1/1980 | Reed | 475/81 X |
| 4,185,521 | 1/1980 | Beals | 74/861 X |
| 4,261,229 | 4/1981 | Mizuno | 74/866 |
| 4,306,467 | 12/1981 | Pollman | 74/867 |
| 4,309,917 | 1/1982 | Leet | 74/861 |
| 4,368,653 | 1/1983 | Mizuno et al. | 475/76 X |
| 4,766,779 | 8/1988 | Massy | 74/862 |

FOREIGN PATENT DOCUMENTS 2405804  8/1974  Fed. Rep. of Germany ........ 475/81

*Primary Examiner*—Rodney H. Bonck
*Assistant Examiner*—Ryan W. Massey
*Attorney, Agent, or Firm*—Herbert Dubno

[57] ABSTRACT

Arrangement and method of operating a variable drive unit with a selector switch for the preselection of a long-term speed and a control unit which allows for the continuous operation of a continuously variable power split transmission only at reduction ratios ($\phi_{continuous}$) having a certain minimum interval ($\phi_{min}$) from the reduction ratio at the shift points between the speed ranges in the mechanical branch of the transmission and the control unit changes the speed of the internal combustion engine in order to reach speeds lying within the minimum interval and controlled by changing the engine speed while maintaining reduction ratio of the transmission instant.

4 Claims, 2 Drawing Sheets

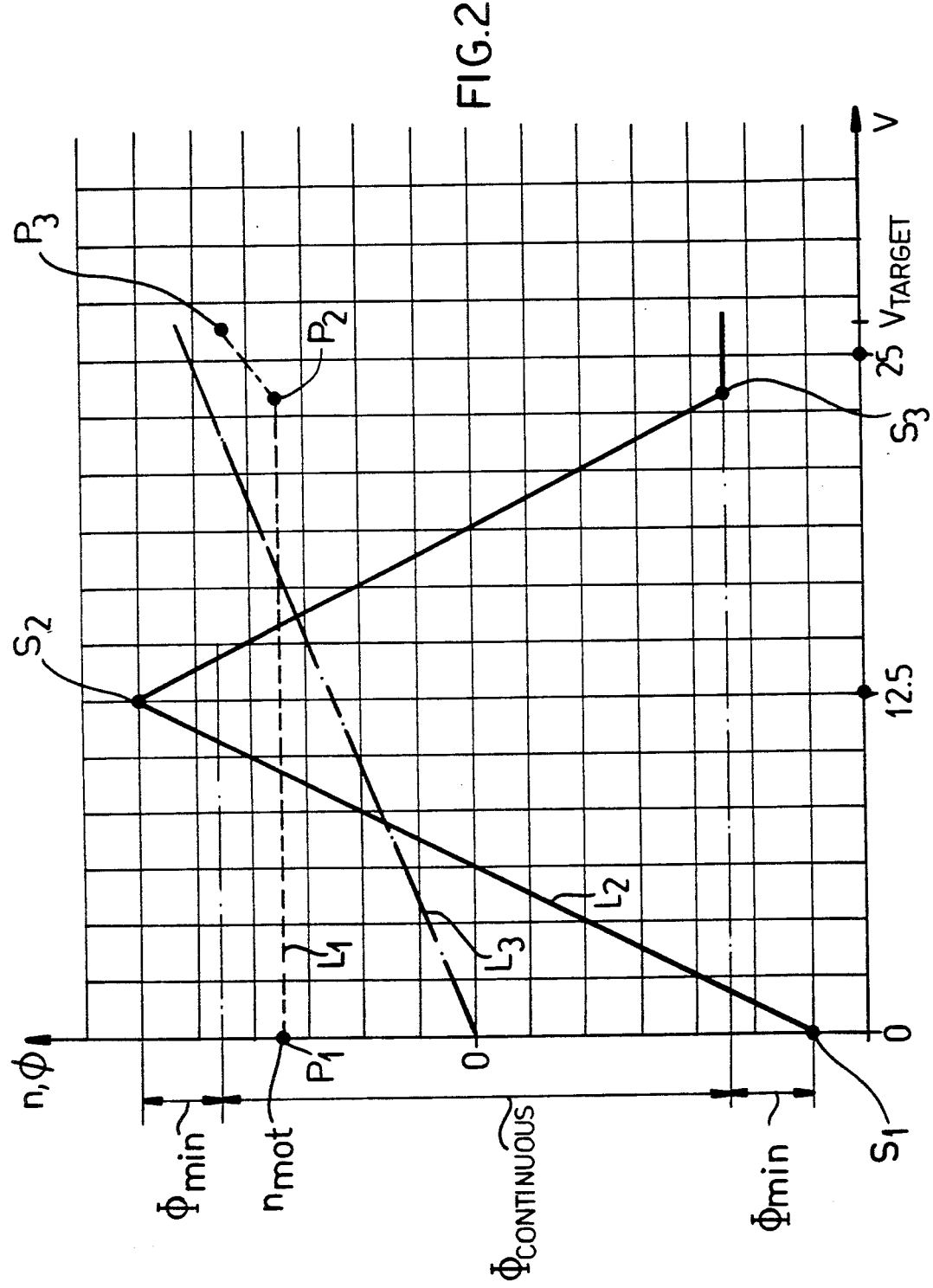

ARRANGEMENT AND METHOD FOR OPERATING A VARIABLE DRIVE UNIT

CROSS REFERENCE TO RELATED APPLICATIONS

This application is a National Phase application of PCT/EP89/00956 filed Aug. 12, 1989 and based upon German National Application P 38 27 862.6 filed Aug. 17, 1988 under the International Convention.

FIELD OF THE INVENTION

The invention relates to an arrangement and a method for operating a continuously variable drive unit for a motor vehicle with an adjustable internal combustion engine and a transmission with continuously variable speed ratio adapted to be regulated automatically without shifting of the transmission by controlling the speed of the internal combustion engine.

BACKGROUND OF THE INVENTION

A control arrangement of a continuously variable power split transmission driven by an internal combustion engine is known (Steuerungen, August 1987, pages 38–36), Wherein a pedal gives a pedal path signal which together with an engine speed signal of the internal combustion engine is involved in the setting of the throttle valve opening and in the control of a servo adjusting device for the continuous variation of the power split transmission. The power split transmission, with a mechanical branch and a hydrostatic branch, comprises multishaft linkages, which superimpose the continuously variable engine speed (rpm) of the hydrostatic branch on the constant input engine speed of the mechanical branch. The mechanical branch of the power split transmission has several modes. The shifting of the modes in the mechanical branch takes place at a synchronous rotational speed of the output linkage shafts of the linkage. In the hydrostatic branch and the linkage input shaft directly driven by the internal combustion engine, the synchronous speed depends on the engine speed of the internal combustion engine The shifting of the stages is monitored by the control device, which, however, does not determine the frequency of these shifting processes.

An essential advantage of continuously variable drive units is that the internal combustion engine can be operated with constant engine speed over the entire speed range, for instance with an engine speed at which the internal combustion engine registers its best fuel consumption value. The changes in the vehicle speed are produced by changes in the transmission ratio. In this way, a well-defined relationship between the transmission ratio and the travel speed of the vehicle results. If the driver selects a speed for the long-term operation of the vehicle, this can be reached exactly at a transmission ratio which corresponds to the one at the shift point or close to one shift point of the mechanical branch of the transmission, so that, when the cruising speed variations are small, this shifting process between two neighboring speed ranges repeats itself frequently. Particularly for agricultural vehicles, which are used on very uneven terrain, the road resistance changes very often and suddenly, and the consequences are oscillations in the travel speed of the vehicle. If, for instance during work in the fields, the agricultural vehicle is operated with a preselected long-term speed coming closely to the one of the shift points, the oscillations in the travel speed lead to frequently repeated shifts between two neighboring speed ranges. This contributes to the increased wear and tear of the transmission in general, but especially of the clutches between linkages and transmission output shafts. Also, the efficiency of the transmission and the general comfort of the vehicle decrease.

OBJECT OF THE INVENTION

It is the object of the invention to create an arrangement and a method for operating a drive unit with a continuously variable reduction ratio, which makes possible the long-term operation of the drive unit at a preselected engine speed of the output shaft of the transmission which is close to a shift point in the mechanical branch of the transmission, thereby eliminating the repeated shifting process.

SUMMARY OF THE INVENTION

According to the invention, this object is attained in that within the region of the shift point a shift suppression is provided, whereby an rpm which is not within the range of the shift suppression can be achieved solely by changing the ratio of the variable power split transmission at a constant engine speed of the internal combustion engine, while the rotational speed of the transmission output shaft at a preselected value lying within the range of the shift suppression can be achieved starting from the respective limit of the shift suppression by changing the rpm of the internal combustion engine, while the ratio of the continuously variable power split transmission is kept constant.

According to the invention, the operation of an adjustable drive unit is performed with a selector switch for the preselection of a long-term speed and of a control device which permits long-term operation of a continuously variable power split transmission only at ratios having a certain minimum interval in the reduction ratio at the gear change points between the speed ranges in the mechanical branch of the transmission, and the control device changes the speed of the internal combustion engine in order to attain final speeds which cannot be attained with permissible ratios of the transmission.

An essential advantage of the inventive concept consist in that the control device avoids an operational state of the continuously variable drive unit wherein, at the slightest change of the rotational speed of the transmission's output shaft, the relationship of the reduction ratios in the mechanical branch of the transmission is shifted. If the preselected final speed lies outside the range of the shift suppression, the control device resets exclusively the ratio of the transmission and reaches at a constant rotational speed of the internal combustion engine the preselected final speed. At a slight deviation of the final speed from the shift point of the mechanical branch of the transmission, i.e. final speed within the range of the shift suppression, the control device resets the transmission only up to a reduction ratio which is at an interval from the reduction rate at the shift point, so that the shift point is not reached at slight alterations of the final speed. The control device resets then the engine speed of the internal combustion engine, in order to reach the targeted final speed.

Thereby, for instance, the driver of a motor vehicle is not limited in the selection of the speed he desires for operating the vehicle, the efficiency of the transmission at the shift points is improved and the wear of the drive unit as a whole is reduced.

The shifting process in the mechanical branch of the power split transmission in order to attain the preselected speed is suppressed, when the internal combustion engine is operated at 90 percent or more of its salient (peak) output. A minor increase in the road resistance is sufficient in order to lower the engine speed of the internal combustion engine, in this mode of operation. By suppressing the shifting process in the mechanical branch of the power split transmission from a certain output efficiency up, e.g. 90 percent of the salient (peak) output of the internal combustion engine, possible constant up- and down shifting is avoided.

BRIEF DESCRIPTION OF THE DRAWING

The above and other objects, features and advantages of my invention will become more readily apparent from the following description, reference being made to the accompanying highly diagrammatic drawing in which:

FIG. 2 is a graphic chart illustrating the method according to the invention.

SPECIFIC DESCRIPTION

Figure 1:
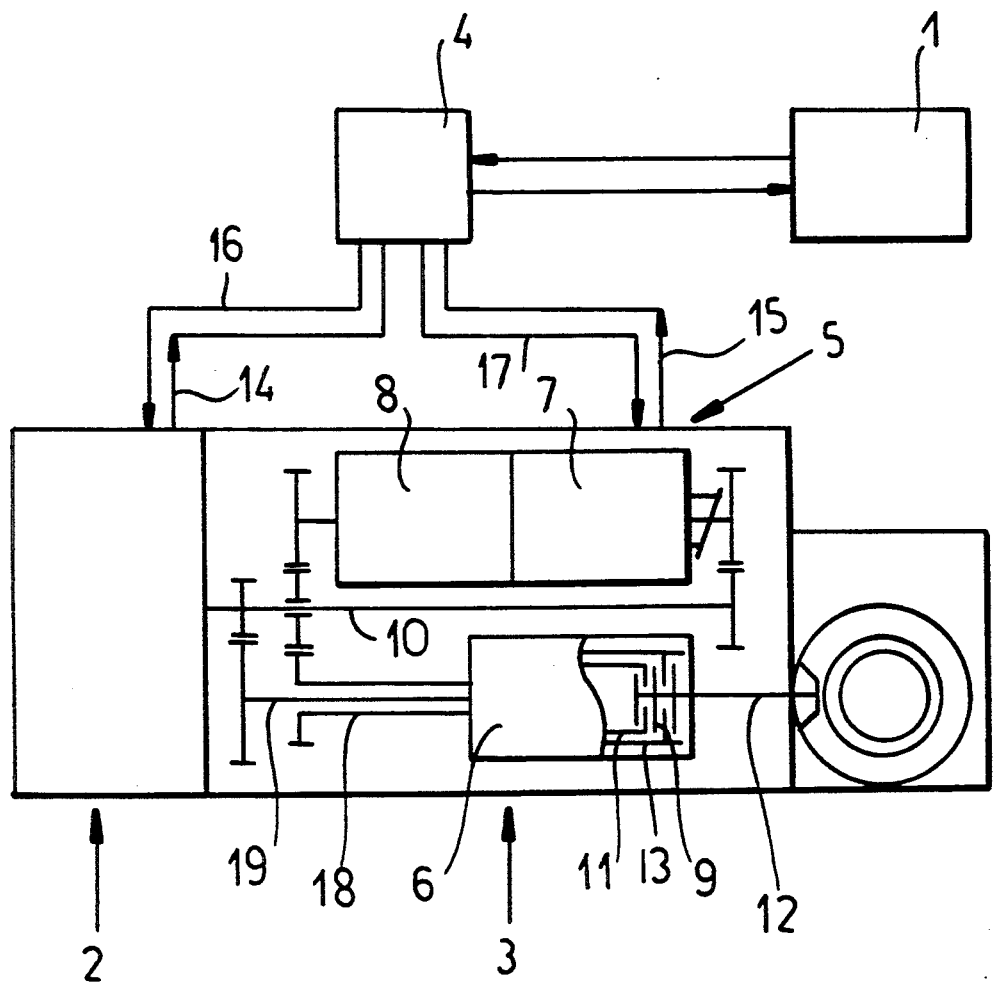
FIG. 1 is a schematic view of a hydromechanical transmission according to the present invention.

By means of a selector switch 1, a freely selectable speed is set. The variable drive unit consists of an adjustable internal combustion engine 2 of the known construction type, to which a continuously variable, hydrostatic-mechanical power split transmission 3 is flanged. Between the internal combustion engine 2 and the transmission 3, there is no shiftable clutch. A control device 4 automatically controls the engine speed of internal combustion engine 2 and the reduction ratio of the continuously variable hydrostatic-mechanical power split transmission 3, so that the rotational speed of an output shaft 12 of the transmission 3 is adapted correspondingly to the preselected speed. For this purpose, a measured-value sensor at a transmission input shaft 10 is provided and another measured-value sensor is provided at the transmission output shaft 12, which transmit the rotational speeds via lines 14, 15 to the control unit 4. Depending on a stored travel program, the control unit 4 emits setting signals over the lines 16, 17 to the internal combustion engine 2 and to the transmission 3.

The control of the internal combustion engine 2 takes place in the usual manner by throttling the air-intake cross section or by controlling the amount of injected fuel. The operation of internal combustion engine 2 has to take place primarily at constant engine speeds.

The control unit 4 determines the reduction ratio of the transmission 3 via the angle of displacement of a variable primary unit 7 in the hydrostatic branch 5 and over clutches 9, which establish the reduction in the mechanical transmission branch 6.

The primary unit 7 in the hydrostatic transmission branch 5 is directly driven by the adjustable internal combustion engine 2 via driving shaft 10, and rotates with a speed which is proportional to the speed of the internal combustion engine 2.

Within its adjustment range, the reduction ratio of the hydrostatic transmission branch 5 is continuously variable, by continuously altering the delivery volume of the primary unit 7 and thereby the rotational speed of a secondary unit 8 of the hydrostatic branch 5 of transmission 3. The continuous reduction range of the hydrostatic transmission branch 5 is multiplied by transmission elements, e.g. planetary gears in the mechanical transmission branch 6 of the transmission 3.

Via a reduction gear, the internal combustion engine 2 drives the mechanical transmission branch 6, which comprises at least one linkage gearing (not shown in the drawing). Via a hollow shaft 18, the secondary unit 8 actuates the linkage gearing with a continuously variable rotational speed. The internal combustion engine 2, via a shaft 19, actuates the linkage gearing with a constant rotational speed. The linkage shafts 11, 13 of the linkage gearing are driven with continuously variable speeds, which result from the summation of the continuously variable speeds of the secondary unit 8 and the constant speed of the input shaft 19.

When the delivery volume of the primary unit 7 is continuously increased, a linkage shaft 11 connected with the transmission output shaft 12 via clutches 9 reaches a synchronous rpm with a linkage shaft 13 which is assigned to the neighboring rpm range. The clutch 9 connects at first the shaft 13 with the transmission output shaft 12 and immediately afterwards releases the linkage shaft 11 involved in the preceding speed range.

FIG. 2: With the aid of the diagram, the operation of the control device for a continuously variable drive unit, consisting of an internal combustion engine and a power split transmission with three transmission stages in the mechanical transmission branch according to FIG. 1, will be described in greater detail. For this example, the speeds at which ratio reduction alterations occur in the mechanical transmission branch will be set at 12.5 and 25 km/h. The vehicle speed is plotted on the abscissa. If the final speed selected by the driver is 26 km/h and the internal combustion engine is to be operated at constant rpm for instance at the most favorable consumption values, the control unit tries to reach the final speed in the following manner:

Engine speed of internal combustion engine $n_{Mot}$ according to line L1 in the range P1 to P2: The internal combustion engine is set to an engine speed $n_{Mot}$ which entails the most favorable consumption values, e.g. an average engine speed which is constantly maintained. A measured-value sensor at the driven shaft 10 of the internal combustion engine 2 can be connected to the control unit 4 for this purpose, so that the constant engine speed can be monitored.

Angle of displacement of the primary unit according to line L2 in the range S1 to S2: The control unit 4 accelerates the vehicle from standstill first by varying the reduction of the transmission 3. In the first speed range up to 12.5 km/h, the angle of traverse of the primary unit 7 is adjusted correspondingly to the line L2 from S1 to S2. At S2, synchronous rotational speed is reached. The control unit 4 triggers the shifting of the second speed range in the mechanical transmission branch 6.

Angle of displacement of the primary unit according to line L2 in the range S2 to S3: Further alterations of the reduction of the transmission 3 are effected, by the control unit 4 again by changing the angle of displacement of the primary unit 7 up to the point S3. An effective shift-suppression range of 10 percent of the reduction ratio at the gear shift point can be considered to be sufficient insurance against frequent passages through the gear shift point, in this example. At a preselected speed of 25 km/h, according to the invention, the control unit 4 interrupts the process of increase of the vehicle speed by changing the transmission ratio at 22.5 km/h. The angle of displacement of the primary unit 7 does not undergo further change and the gear reduction stays constant. The final speed $V_{target}$ is reached by increasing the engine speed $n_{Mot}$ of the internal combustion engine 2, correspondingly to the course of the line L1 from P2 to P3. In this process, the speed increase according to line L3, from 0 up to the point when the final speed $V_{target}$ is reached, is to remain constant.

If a gear shift point is to be reached and the internal combustion engine 2 runs already very close to, e.g. 90 percent of, peak output, the control unit 4 suppresses the gear shift in the mechanical branch 6 of the power split transmission 3, according to the above-mentioned process.

The output of the internal combustion engine 2 can be determined through measured-value sensors, which for instance read the fuel throughflow and the engine speed of the internal combustion engine 2 and convert these measured values to actuator signals in an electronic data processing device, e.g. a digital computing device.

We claim:

1. A method of operating a drive unit including an engine and a hydrostatic-mechanical power split transmission of a motor vehicle, said method comprising the steps of:

(a) maintaining a continuous speed of the engine;
 (b) while maintaining said continuous speed of the engine controllably changing a reduction ratio of the transmission between shift points of said transmission, thereby achieving corresponding speeds of an output shaft of said drive unit;
 (c) substantially at said shift points mechanically shifting said transmission, at least one of said shift points having a shift suppression range of target speeds; and
 (d) automatically in said range suppressing a corresponding shifting of said transmission, but controllably changing the speed of the engine to thereby obtain a selected target speed lying within said range in a region of said one of the shift points while maintaining said reduction ratio of the transmission constant.

2. An assembly for operating a motor vehicle, said assembly comprising:

an internal combustion engine provided with a driving shaft;
 a power split transmission driven by said driving shaft and provided with a transmission output shaft determining a speed of the vehicle, said transmission having shift points, at least one of said shift points having a shift suppression range of target speeds, said transmission comprising:
  a hydrostatic branch provided with a hydrostatic output shaft rotatable at a variable speed and operable between the shift points of said transmission to control a reduction ratio of the transmission,
  a mechanical branch including at an output side at least one linkage gearing, said linkage output shafts rotatable at different rotational speeds between the shift points,
  said mechanical branch being provided with clutch means operable at a synchronous speed for changing a reduction ratio of the transmission by selectively connecting said first and second linkage shafts with said transmission output shaft at said shift points; and
 means for controllably changing the speed of the engine at said one of said shift points to thereby obtain a selected target speed lying within said range in a region of said one of the shift points while suppressing a corresponding shifting of said transmission in order to maintain said reduction ratio of the transmission constant.

3. The assembly defined in claim 2 wherein said shift suppression range is 10% of said synchronous rotational speed of the linkage shafts at said one of said shift points.

4. The assembly defined in claim 2 wherein said reduction ration of the transmission is constant at 90% of the peak output of said engine, said reduction ration being kept constant while the speed of said vehicle being reached upon increasing the speed of said engine within said suppression range.

* * * * *